US008544947B2

(12) United States Patent  (10) Patent No.: US 8,544,947 B2
Sloan  (45) Date of Patent: Oct. 1, 2013

(54) BICYCLE FITTING APPARATUS AND METHOD

(76) Inventor: William Sloan, Maryville, TN (US)

( * ) Notice: Subject to any disclaimer, the term of this patent is extended or adjusted under 35 U.S.C. 154(b) by 565 days.

(21) Appl. No.: 12/761,117

(22) Filed: Apr. 15, 2010

(65) Prior Publication Data

US 2011/0254328 A1    Oct. 20, 2011

(51) Int. Cl.
*B62J 1/00*    (2006.01)

(52) U.S. Cl.
USPC .............. 297/215.13; 297/215.14; 297/215.15

(58) Field of Classification Search
USPC .............. 297/215.13, 215.14, 215.15, 344.15
See application file for complete search history.

(56) References Cited

U.S. PATENT DOCUMENTS

| | | | | |
|---|---|---|---|---|
| 600,408 | A * | 3/1898 | Crowden | 33/655 |
| 2,821,242 | A * | 1/1958 | Manegold | 248/421 |
| 3,917,210 | A * | 11/1975 | Miller | 248/419 |
| 3,964,725 | A * | 6/1976 | Matsui et al. | 248/421 |
| 5,571,273 | A * | 11/1996 | Saarinen | 297/215.15 |
| 5,779,249 | A * | 7/1998 | Lin | 280/287 |
| 6,174,027 | B1 * | 1/2001 | Lemmens | 297/215.15 |
| 6,669,603 | B1 * | 12/2003 | Forcillo | 482/57 |
| 7,314,248 | B2 * | 1/2008 | Mabon et al. | 297/172 |
| 7,926,876 | B2 * | 4/2011 | Zadai et al. | 297/344.17 |
| 2003/0171190 | A1 * | 9/2003 | Rice | 482/57 |
| 2004/0088845 | A1 * | 5/2004 | Winkenbach et al. | 29/281.5 |
| 2006/0006707 | A1 * | 1/2006 | Lin | 297/215.14 |
| 2007/0138846 | A1 * | 6/2007 | Ritchey | 297/215.14 |
| 2007/0142177 | A1 * | 6/2007 | Simms et al. | 482/8 |
| 2007/0281828 | A1 * | 12/2007 | Rice | 482/4 |
| 2009/0126211 | A1 * | 5/2009 | Mandaric | 33/503 |
| 2009/0166997 | A1 * | 7/2009 | Fujiwara | 280/288.4 |
| 2009/0218857 | A1 * | 9/2009 | Ochendalski | 297/215.15 |
| 2009/0286654 | A1 * | 11/2009 | Rice | 482/4 |
| 2011/0185803 | A1 * | 8/2011 | Demajistre et al. | 73/147 |
| 2011/0254329 | A1 * | 10/2011 | Kim | 297/215.15 |
| 2012/0088638 | A1 * | 4/2012 | Lull | 482/57 |
| 2013/0065733 | A1 * | 3/2013 | Kautz et al. | 482/57 |

FOREIGN PATENT DOCUMENTS

| | | | |
|---|---|---|---|
| DE | 102005038565 | * | 2/2007 |
| EP | 2025585 | * | 2/2009 |
| JP | 58199231 A | * | 11/1983 |
| WO | WO 9403357 A1 | * | 2/1994 |

* cited by examiner

*Primary Examiner* — David A Allred
(74) *Attorney, Agent, or Firm* — Pitts & Lake, PC

(57) ABSTRACT

An apparatus for fitting a bicycle saddle comprises a mounting rod secured to a bicycle frame, a height adjuster mounted upon the mounting rod, a lateral adjuster mounted upon the height adjuster, a tilt orientation adjuster mounted upon the lateral adjuster, and a clamp securing the saddle to the tilt orientation adjuster.

2 Claims, 3 Drawing Sheets

BICYCLE FITTING APPARATUS AND METHOD

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to apparatus for fitting a bicycle saddle, also called a seat, for a rider.

More particularly, this invention pertains to apparatus for adjusting the height and orientation of a bicycle saddle while the rider operates the bicycle 2. Description of the Related Art Every person who rides a bicycle is shaped differently, including, without limitation, the lengths of arms, legs and torsos. In addition, each person has different musculature. For each such person there is an optimum height of the saddle, both fore and aft, and tilt orientation of the bicycle saddle in order to achieve the optimum desired efficiency by the rider. The efficiency may also differ depending upon the type of riding the person is planning. A marathon race requires different efficiency from a dash, for example.

Typically, the bicycle is mounted upon a stationary trainer or treadmill and the saddle is adjusted to an approximate height, fore and aft, and tilt orientation. The rider then peddles and the efficiency is measured through the treadmill. The rider then dismounts from the bicycle and the saddle is adjusted in height and/or orientation. The rider re-mounts the bicycle and once again peddles and the efficiency is again measured. This iterative process is repeated until a satisfactory height and orientation is achieved. It is a slow and imprecise process as continuity is lost because of the start and stop procedure.

BRIEF SUMMARY OF THE INVENTION

According to one embodiment of the present invention, an apparatus for adjusting the height and orientation of a bicycle saddle while it is occupied is provided. The height of the saddle is adjusted by a scissor lift. The distance of the saddle from the handlebars is adjusted by a worm gear. The tilt orientation of the saddle is adjusted by a bevel gear. Adjustments are incrementally adjusted to an optimum position without requiring the rider to dismount from the bicycle. Thereafter, the exact position of the saddle is measurable, so that it may be removed from the fitting apparatus and remounted directly on the bicycle in the same optimum position.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
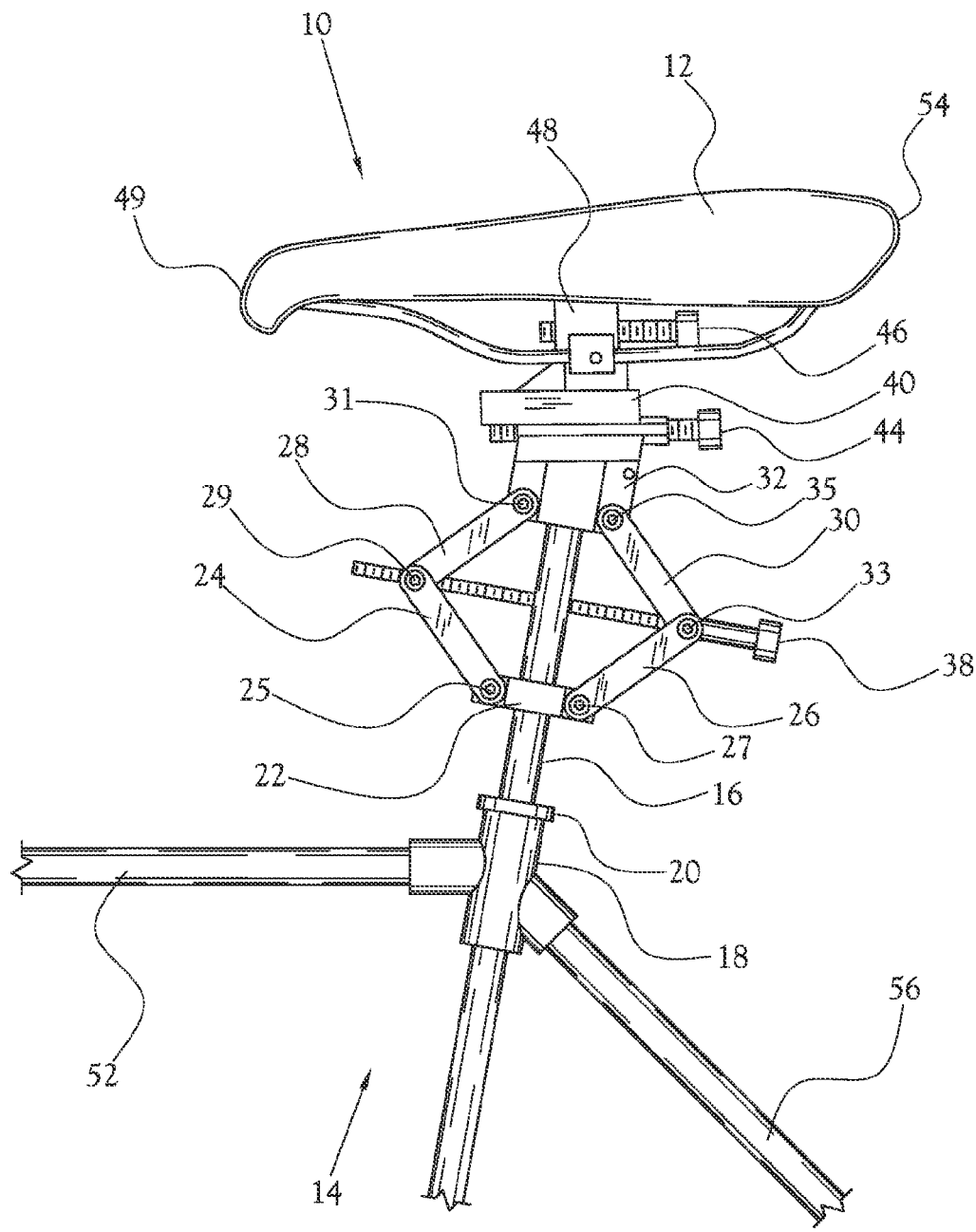
FIG. 1 is a side elevation view of an apparatus embodying various features of the present invention.
Figure 2:
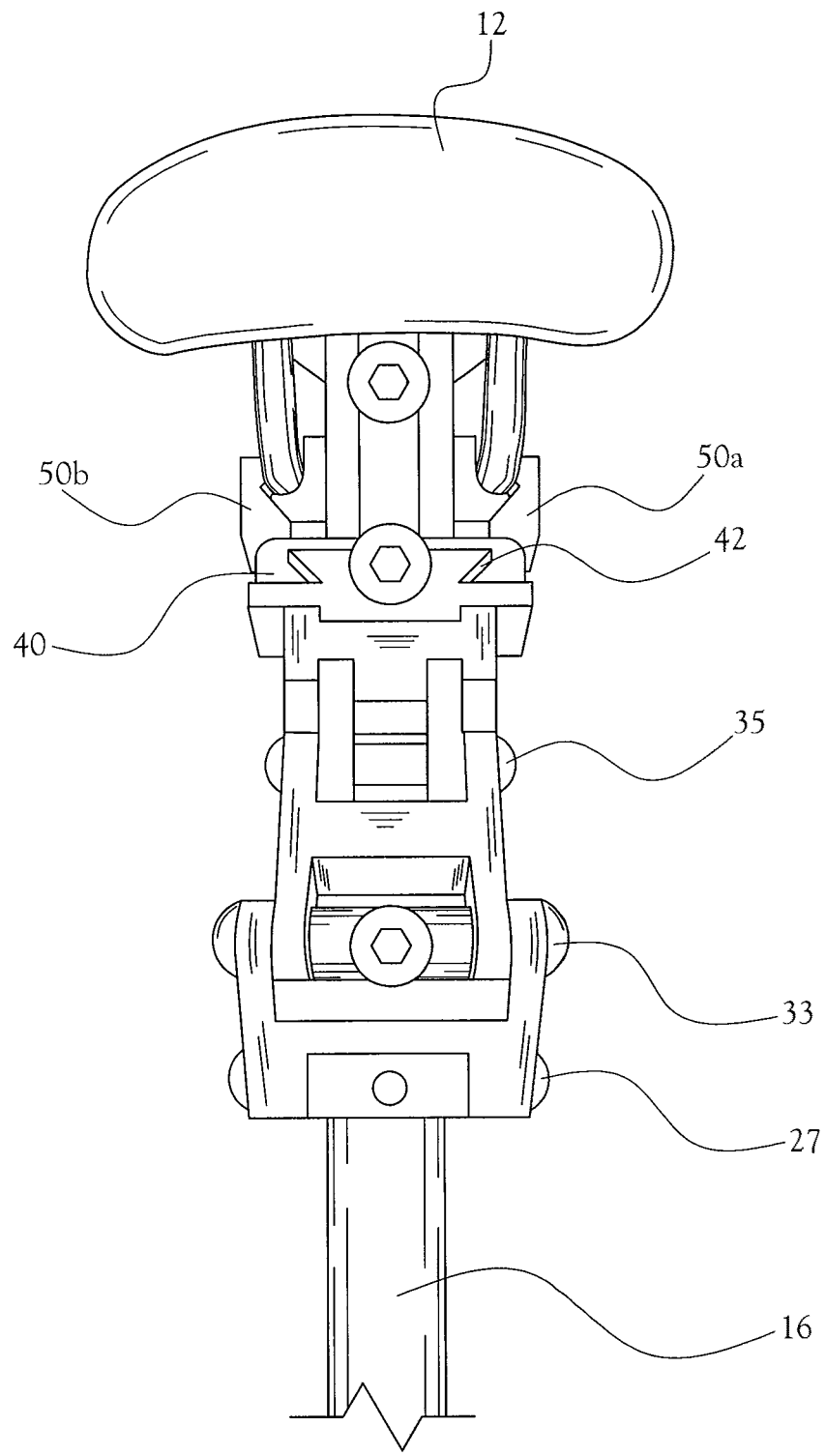
FIG. 2 is a rear elevation view of an apparatus embodying various features of the present invention.
Figure 3:
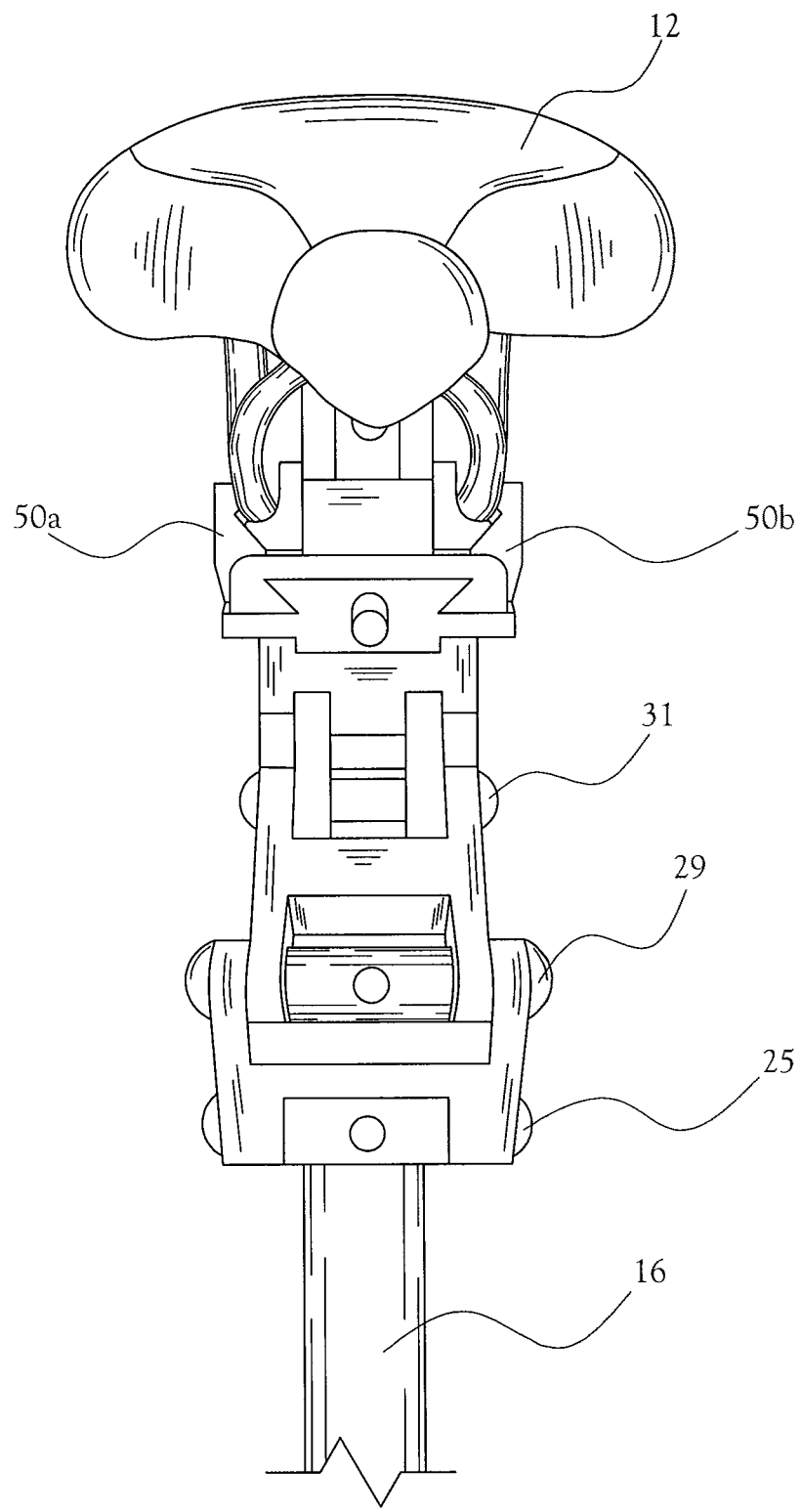
FIG. 3 is front elevation view of an apparatus embodying various features of the present invention.

Referring the Figures, in which similarly numbered parts represent similar parts, an apparatus 10 is provided for adjusting height, fore and aft, and the tilt orientation of a bicycle saddle 12 relative to a bicycle 14. The apparatus 10 includes a mounting rod 16, which may be solid or tubular, slidably inserted into a tubular frame member 18 and secured in a fixed position by a clamp 20 typically used to secure bicycle saddle supports to bicycle frames.

A securing bracket 20 is mounted in a fixed location on the mounting rod 16. A lower fore H-shaped scissor frame 24 is pivotally mounted upon the securing bracket 20 by a first pivotal bolt 25. A lower aft H-shaped scissor frame 26 is pivotally mounted upon the securing bracket 20 by a second pivotal bolt 27, opposite from the fore frame 24. An upper fore H-shaped scissor frame 28 is pivotally mounted on the outboard end of the lower fore frame 24 by a third pivotal bolt 29 and pivotally secured to a sliding bracket 32 by a fourth pivotal bolt 31. Similarly, an upper aft H-shaped scissor frame 30 is pivotally mounted upon the outboard end of the lower aft frame 26 by a fifth pivotal bolt 33 and pivotally secured to the sliding bracket 32 by a sixth pivotal bolt 35.

A threaded scissor adjusting bolt 38 extends freely through an aperture defined in the mounting rod 16. The adjusting bolt and is threadably engaged with a threaded aperture defined in second pivotal bolt 29 and a threaded aperture defined in the fifth pivotal bolt 33. Rotation of the adjusting bolt 38 causes the third pivotal bolt 29 and the fifth pivotal bolt 33 to move toward or away from one another, depending upon the direction of rotation. Such movement causes the sliding bracket 32 to move up or down relative to the fixed bracket 22, thus adjusting the height of the saddle relative to the frame 18.

A lateral adjuster 40 is slidably mounted upon the sliding bracket 32 in a groove 42 defined in the sliding bracket 32. A lateral adjusting bolt 44 (a worm gear) is threadably engaged between the sliding bracket 32 and the lateral adjuster 40, whereby rotation of the adjusting bolt 44 effects forward and aft movement of the adjuster 40 relative to the sliding bracket 32, thus adjusting the distance of the saddle relative to the frame 18.

Tilt orientation adjustment is provided by a threaded tilt adjustment bolt 46 which is threadably engaged with a bevel gear rotatably mounted within a housing 48 secured upon the lateral adjuster 40. Rotation of the tilt adjustment bolt 46 effects upward and downward tilt of the fore end of the saddle 12 relative to the frame 18.

In operation, a saddle 12 is secured to the apparatus 10 by two saddle clamps 50a and 50b and the mounting rod 16 is secured to the frame 18 by the clamp 20. The saddle 12 is adjusted to a position approximated to be near to the optimum position, based upon the proposed rider, using the clamp 20, the scissor adjusting bolt 38, the lateral adjusting bolt and the tilt adjusting bolt 46. The rider then mounts the bicycle, mounted upon a treadmill or trainer and sits upon the saddle 12. At this time, another person can adjust the saddle's height, lateral position and tilt orientation as requested by the rider without requiring the rider to dismount. Moreover, through the treadmill or trainer, the optimum position for the seat for that particular rider can be determined without requiring the rider to dismount.

Once the optimal position for the saddle is determined, a plumb extended from the fore end 49 of the saddle 12 defines the exact distance between the fore end 49 of the saddle and the crossbar 52. A plumb extended from the aft end 54 of the saddle defines the distance between the aft end 54 and the frame extension 56. The apparatus 10 is then removed from the frame 18 and the saddle 12 is removed from the clamps 50a and 50b. The saddle is then re-mounted upon the bicycle in the optimum position using a standard mounting frame in the same position defined by the measured distances between the saddle 12 and frame 18.

From the foregoing description, it will be recognized by those skilled in the art that an apparatus for fitting a saddle for a particular bicycle and individual rider has been provided.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for fitting a bicycle saddle, said apparatus comprising:
    a mounting rod secured to a bicycle frame;
    a height adjuster mounted upon said mounting rod, said height adjuster comprising a fore scissor lift, an aft scissor lift, and a bolt extending through an opening defined in said mounting rod and engaging said fore and aft scissor lifts;
    a fore and aft adjuster mounted upon said height adjuster;
    a tilt orientation adjuster mounted upon said fore and aft adjuster; and
    a clamp securing said saddle to said tilt orientation adjuster.

2. An apparatus for fitting a bicycle saddle, said apparatus comprising:
    a mounting rod securable to a bicycle frame;
    a height adjuster mounted upon said mounting rod, said height adjuster comprising:
        a fore scissor lift and an aft scissor lift;
        a securing bracket mounted in a fixed location on said mounting rod and a sliding bracket slidably mounted along said mounting rod;
        said fore scissor lift comprising a lower fore scissor frame having a first end pivotally mounted to said securing bracket and a second end extending along a fore side of said mounting rod;
        said fore scissor lift comprising an upper fore scissor frame having a first end pivotally mounted to said second end of said lower fore scissor frame and a second end pivotally mounted to said sliding bracket;
        said aft scissor lift comprising a lower aft scissor frame having a first end pivotally mounted to said securing bracket and a second end extending along an aft side of said mounting rod;
        said aft scissor lift comprising an upper aft scissor frame having a first end pivotally mounted to said second end of said lower aft scissor frame and a second end pivotally mounted to said sliding bracket; and
        a scissor adjusting bolt extending through an opening defined in said mounting rod and engaging said fore and aft scissor lifts, said scissor adjusting bolt being rotatable in a first direction to cause said sliding bracket to slide along said mounting rod toward said securing bracket and being rotatable in a second direction to cause said sliding bracket to slide along said mounting rod away from said securing bracket;
    a fore and aft adjuster mounted upon said height adjuster;
    a tilt orientation adjuster mounted upon said fore and aft adjuster; and
    a clamp securing said saddle to said tilt orientation adjuster.

* * * * *